(12) United States Patent
Hagendorf et al.

(10) Patent No.: US 11,879,823 B2
(45) Date of Patent: Jan. 23, 2024

(54) FILTER SUBSTRATE FOR FILTERING AND OPTICALLY CHARACTERIZING MICROPARTICLES, METHOD FOR PRODUCING THE FILTER SUBSTRATE, AND USE OF THE FILTER SUBSTRATE

(71) Applicants: FRAUNHOFER-GESELLSCHAFT ZUR FÖRDERUNG DER ANGEWANDTEN FORSCHUNG E. V., Munich (DE); HOCHSCHULE ANHALT (FH), Köthen (DE); BUNDESANSTALT FÜR MATERIALFORSCHUNG UND-PRÜFUNG (BAM), Berlin (DE)

(72) Inventors: Christian Hagendorf, Halle (DE); Kai Kaufmann, Halle (DE); Ulrike Braun, Berlin (DE)

(73) Assignees: FRAUNHOFER-GESELLSCHAFT ZUR FÖRDERUNG DER ANGEWANDTEN FORSCHUNG E.V., Munich (DE); HOCHSCHULE ANHALT (FH), Köthen (DE); BUNDESANSTALT FÜR MATERIALFORSCHUNG UND-PRÜFUNG (BAM), Berlin (DE)

( * ) Notice: Subject to any disclaimer, the term of this patent is extended or adjusted under 35 U.S.C. 154(b) by 726 days.

(21) Appl. No.: 17/045,976

(22) PCT Filed: Apr. 11, 2019

(86) PCT No.: PCT/EP2019/059275
§ 371 (c)(1),
(2) Date: Oct. 7, 2020

(87) PCT Pub. No.: WO2019/197542
PCT Pub. Date: Oct. 17, 2019

(65) Prior Publication Data
US 2021/0364405 A1    Nov. 25, 2021

(30) Foreign Application Priority Data

Apr. 12, 2018 (DE) .................. 10 2018 205 529.7

(51) Int. Cl.
*G01N 15/06* (2006.01)
*B23K 26/382* (2014.01)
*G01N 1/40* (2006.01)

(52) U.S. Cl.
CPC ....... *G01N 15/0612* (2013.01); *B23K 26/382* (2015.10); *G01N 1/4077* (2013.01); *G01N 2001/4088* (2013.01)

(58) Field of Classification Search
CPC ............ G01N 15/0612; G01N 1/4077; G01N 2001/4088; G01N 2015/0053; G01N 15/0618; G01N 15/0625; B23K 26/382
(Continued)

(56) References Cited

U.S. PATENT DOCUMENTS

| 8,647,574 | B2 | 2/2014 | Halverson et al. |
| 8,948,563 | B2 | 2/2015 | Hummel et al. |

(Continued)

FOREIGN PATENT DOCUMENTS

| CN | 101909756 A | 12/2010 |
| CN | 102713563 A | 10/2012 |

(Continued)

OTHER PUBLICATIONS

Browne et al., "Accumulation of Microplastic on Shorelines Worldwide: Sources and Sinks," *Environmental Science & Technology* 45(21): 9175-9179 (2011).

(Continued)

*Primary Examiner* — Md M Rahman
(74) *Attorney, Agent, or Firm* — Leydig, Voit & Mayer, Ltd.

(57) ABSTRACT

The present invention relates to a filter substrate for filtering and optically characterizing microparticles. The filter sub-
(Continued)

strate comprises a wafer having a thickness of at least 100 pm and a transmittance of at least 10% for radiation in the wavelength range of 2500 nm to 15000 nm. Furthermore, the surface of the front side and/or the surface of the rear side of the wafer is completely or partially provided with an antireflective layer, which prevents the optical reflection of radiation in the wavelength range of 200 nm to 10000 nm. Moreover, the wafer has, at least in some regions, filter holes having a diameter of 1 pm to 5 mm. With the filter substrate according to the invention, microparticles can be filtered and the microparticles on the filter substrate can be subsequently optically characterized with very high measurement quality. The present invention further relates to a method for producing the filter substrate according to the invention and to the use of the filter substrate according to the invention.

16 Claims, 3 Drawing Sheets

(58) Field of Classification Search
USPC .......................................................... 356/326
See application file for complete search history.

(56) References Cited

U.S. PATENT DOCUMENTS

| 9,646,825 | B2 | 5/2017 | Figuet et al. |
| 2010/0255484 | A1 | 10/2010 | Halverson et al. |
| 2012/0257193 | A1 | 10/2012 | Hummel et al. |
| 2014/0339681 | A1 | 11/2014 | Figuet et al. |
| 2017/0241894 | A1 | 8/2017 | McCaffrey et al. |

FOREIGN PATENT DOCUMENTS

| CN | 103814436 A | 5/2014 |
| DE | 102010051259 A | 5/2012 |
| DE | 102010006439 A1 | 11/2012 |
| DE | 102017107857 A1 | 10/2017 |
| JP | 2011-208993 A | 10/2011 |

OTHER PUBLICATIONS

Kiraly et al., "Multifunctional porous silicon nanopillar arrays: antireflection, superhydrophobicity, photoluminescence, and surface-enhanced Raman scattering," *Nanotechnology* 24(24): 245704 (2013) 10 pgs.

Van Cauwenberghe et al., "Microplastic Pollution in Deep-Sea Sediments," *Environmental Pollution* 182: 495-499 (2013).

German Patent Office, Office Action in German Patent Application No. 10 2018 205 529.7 (dated Nov. 26, 2018).

European Patent Office, International Search Report in International Application No. PCT/EP2019/059275 (dated Jul. 10, 2019).

European Patent Office, Written Opinion in International Application No. PCT/EP2019/059275 (dated Jul. 10, 2019).

International Bureau of WIPO, International Preliminary Report on Patentability in International Application No. PCT/EP2019/059275 (dated Oct. 13, 2020).

Chao et al., "Anti-reflection textured structures by wet etching and island lithography for surface-enhanced Raman spectroscopy," *Applied Surface Science* 357: 615-621 (2015).

Käppler et al., "Identification of microplastics by FTIR and Raman microscopy: a novel silicon filter substrate opens the important spectral range below 1300 cm-1 for FTIR transmission measurements," *Analytical and Bioanalytical Chemistry* 407(22): 6791-6801 (2015).

Käppler et al., "Analysis of environmental microplastics by vibrational microspectroscopy:FTIR, Raman or both?," *Analytical and Bioanalytical Chemistry* 408(29): 8377-8391 (2016).

China National Intellectual Property Administration, Notification of the First Office Action and Search Report in Chinese Patent Application No. 201980025363.1 (dated May 30, 2023).

FILTER SUBSTRATE FOR FILTERING AND OPTICALLY CHARACTERIZING MICROPARTICLES, METHOD FOR PRODUCING THE FILTER SUBSTRATE, AND USE OF THE FILTER SUBSTRATE

CROSS-REFERENCE TO RELATED APPLICATIONS

This patent application is the U.S. national phase of International Application No. PCT/EP2019/059275, filed on Apr. 11, 2019, which claims the benefit of German Patent Application No. 10 2018 205 529.7, filed Apr. 12, 2018, the disclosures of which are incorporated herein by reference in their entireties for all purposes.

The present invention relates to a filter substrate for filtering and optical characterisation of microparticles. The filter substrate comprises a wafer with a thickness of at least 100 μm and a transmission degree of at least 10% for radiation in the wavelength range of 2,500 nm to 15,000 nm. In addition, the surface of the front-side and/or the surface of the rear-side of the wafer is provided, completely or in regions, with an antireflection layer which prevents optical reflection of radiation in the wavelength range of 200 nm to 10,000 nm. Furthermore, the wafer has, at least in regions, filter holes with a diameter of 1 μm to 5 mm. With the filter substrate according to the invention, filtering of microparticles and also a subsequent optical characterisation of the microparticles on the filter substrate is possible with a very high measuring quality. In addition, the present invention relates to a method for the production of the filter substrate according to the invention and also to the use of the filter substrate according to the invention.

Microplastic particles in aqueous systems or the characterisation thereof with optical spectral methods are of great importance for environmental analysis, health and work protection. The input of microplastics, i.e. plastic particles or fibres with values of a few micrometres up to 5 mm in the longest dimension, in water leads ultimately to transport into natural ecosystems and there to enrichment (Browne et al., "Accumulation of microplastic on shorelines worldwide: sources and sinks", Environmental science & technology 45.21 (2011), 9175-9179; van Cauwenberghe et al., "Microplastic pollution in deep-sea sediments", Environmental Pollution 182 (2013), 495-499).

Longer-term effects for ecosystems and populations in these ecosystems are still unclear and largely not yet explored. One of the reasons for this is the lack of harmonised methods, in this case in particular suitable filter systems for a representative, reproducible and efficient sampling and subsequent rapid analysis of the organic particle materials. For unequivocal identification of the chemical composition for identification of the sources and sinks of the microparticles, the required filter systems must fulfil a size-selective filter function, be able to filter large volumes and finally not be impaired in their function by the large number of naturally occurring particles. Furthermore, optical particle analysis with spectral methods requires a broadband transparency of the filter substrates up to the near/medium infrared range (FTIR) and/or a broadband reduced substrate reflection (Raman, Fluorescence Spectroscopy). For reducing the interfering, inorganic and organic accompanying organics of the filter cake, physical-chemical processing steps are required (inter alia density separation with different saturated salt solutions or oxidative treatment with $H_2O_2$). The application of different treatment steps must not impair the functionality of the filter material. This must also be ensured by the application of disinfection steps.

According to the previous state of the art, predominantly particles greater than 300 μm are removed from aqueous systems with neuston nets and, after removal, are transferred to a sample holder in order to implement optical-spectral analyses. These methods are established in the marine sampling field, however are not transferable to limnic flowing waters/turbulent flows. Generally, active pump systems are operated here.

For particle sizes less than 500 μm, fractionated filtrations with different filters based on plastic material (inter alia acetate, Teflon), woven or sintered metal materials or inorganic fibre- or pore filters (aluminium oxide, glass fibres) are used. Because of the problems of complete transference of the samples from the filter materials to optical sample holders, an analysis directly on the filter would be advantageous. In addition, direct detection (also e.g. after the physical-chemical processing steps) would minimise the problem of sample contamination. The listed materials are problematic with respect to interfering/overlaid background signals or the lack of optical transparency. Starting herefrom, it was the object of the present invention to indicate a filter substrate with which both filtering of microparticles and a subsequent optical characterisation of the filtered microparticles on the filter substrate is possible with a very high measuring quality.

This object is achieved by the features of the filter substrate and the method for the production of the filter substrate described herein, and the advantageous developments thereof. Uses of the coated polymer substrate according to the invention are also described.

DETAILED DESCRIPTION OF THE INVENTION

Figure 1:
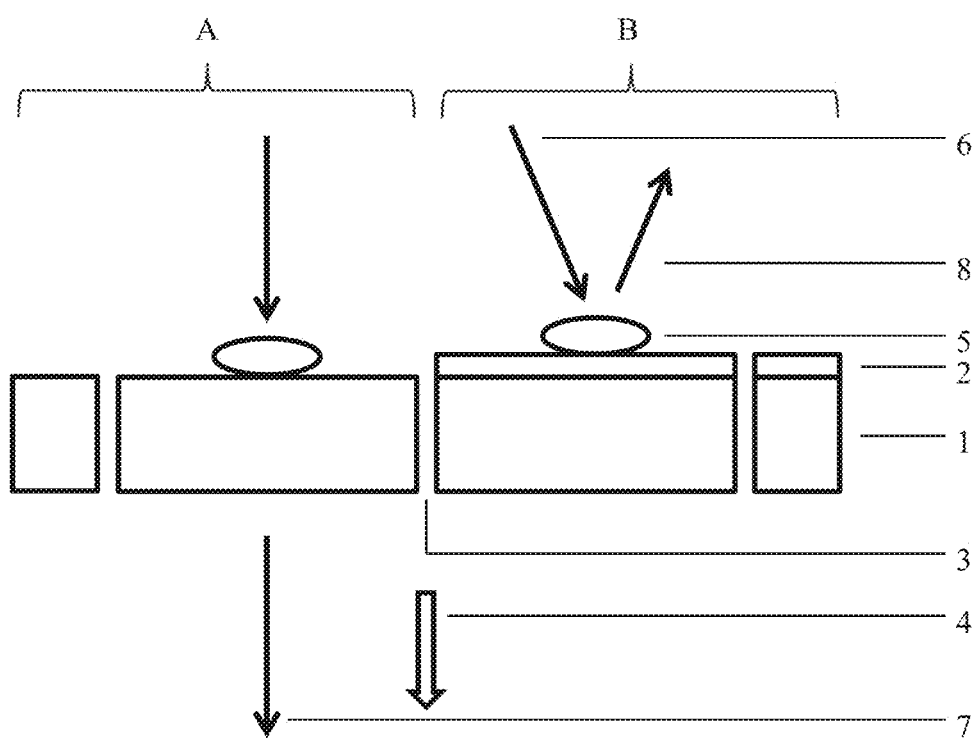
FIG. 1 illustrates a first embodiment of the filter substrate according to the invention. Also illustrated is a method of use thereof.

According to the invention, hence a filter substrate for filtering and optical characterisation of microparticles is indicated. The filter substrate comprises a wafer with a thickness of at least 100 μm and a transmission degree of at least 10% for radiation in the wavelength range of 2,500 nm to 15,000 nm. In addition, the surface of the front-side and/or the surface of the rear-side of the wafer is provided, completely or in regions, with an antireflection layer which prevents an optical reflection of radiation in the wavelength range of 200 nm to 10,000 nm. Furthermore, the wafer has, at least in regions, filter holes with a diameter of 1 μm to 5 mm.

There are understood by microparticles, particles with a diameter of 1 μm to 5,000 μm.

The transmission degree can be determined according to DIN 5036-3 or according to CIE 130-1998.

Because of the filter holes situated in the wafer, the latter can be used as filter substrate since the medium to be filtered (liquid or gaseous) is flushed through the filter holes, whilst microparticles situated in the medium to be filtered remain suspended on the wafer. The filter holes can be introduced into the wafer, e.g. by means of laser boring. As a result, variable hole diameters and variable hole geometries can be obtained. The filter substrate is therefore particularly suitable for use in cascade filter systems for sampling volumes of up to several litres of medium (liquid or gas).

The filter holes extend respectively from the front-side of the filter substrate or of the wafer up to the rear-side of the filter substrate or of the wafer. In other words, the filter holes extend respectively completely through the wafer or through the filter substrate so that the medium to be filtered (liquid or gas) can pass through the filter via the filter holes. The filter holes which extend in one region of the wafer, the surfaces of which are provided with the antireflection layer, also extend through the antireflection layer. The filter holes are therefore free and not covered by the antireflection layer. In other words, the antireflection layer is not disposed above the filter holes.

The filter substrate can be inserted, for example in a suitable mounting, for filtering the microparticles. In addition, the wafer can be supported mechanically by a reinforcing structure likewise inserted in the mounting. This reinforcing structure can concern e.g. a coarse-mesh perforated underlayer, e.g. made of metal or specific plastic material.

According to a general definition, a wafer concerns a thin disc of any shape. For example, the wafer can have a circular or quadratic basic shape. Preferably, the wafer has a circular basic shape. The diameter of the wafer can be e.g. 10 mm to 1,000 mm. By means of a minimum thickness of 100 m, the wafer has sufficient stability to be able to be used as filter substrate for the filtering of microparticles.

Wafers are normally used as substrate for electronic components in semiconductor technology. In the present invention, such a wafer serves in contrast as filter substrate. Wafers are available in suitable thicknesses and materials so that the requirements for stability and for the optical transparency of the filter substrate can readily be fulfilled. In addition, wafers can be provided simply with filter holes (e.g. by means of laser boring). Also application of an antireflection layer is possible (e.g. by introducing a nanostructuring or applying a nanostructured coating). A wafer is hence outstandingly suitable as basic element of the filter substrate according to the invention.

Because of the high transmission degree in the wavelength range of 2,500 nm to 15,000 nm and because of the antireflection layer, the filter substrate is suitable not only for filtering the microparticles but also as substrate for optical characterisation of the microparticles, a very high measuring quality being achieved. Due to the high transmission degree, it is thereby ensured that a sufficient quantity of radiation can be transmitted through the substrate in order to ensure a very good measuring quality in the case of transmission measurements (such as e.g. FTIR). The antireflection layer prevents the optical reflection of radiation in the wavelength range of 200 nm to 10,000 nm. In this way, the signal-to-noise ratio in the case of reflection measurements (such as e.g. Raman measurements) is significantly improved, which leads to a very good measuring quality with these measurements. With the substrate according to the invention, an optical characterisation of the microparticles can hence be implemented with very high measuring quality. Preferably, both transmission measurements and reflection measurements can hereby be jointly implemented, in both cases a very high measuring quality being able to be achieved.

It is thereby particularly advantageous that the filter substrate according to the invention can be used both for filtering and for optical characterisation of the microparticles. In other words, the optical characterisation can be effected directly on the filter substrate so that transfer from the filter substrate to an optical sample holder is no longer necessary. Problems occurring during such a transfer can hence be avoided.

Considered altogether, the filter substrate according to the invention hence enables both filtering of microparticles and a subsequent optical characterisation of the microparticles on the filter substrate with a very high measuring quality.

The surface of the front-side and/or of the rear-side of the wafer can be provided, completely or merely in regions, with an antireflection layer.

If the surface of the front-side and/or of the rear-side of the wafer is provided merely in regions with an antireflection layer, then the filter substrate has at least one region without an antireflection layer on which transmission measurements (e.g. FTIR) can be implemented, and at least one region with an antireflection layer on which reflection measurements (e.g. Raman) can be implemented. This embodiment is particularly advantageous since both transmission measurements and reflection measurements can be implemented thus with very high measuring quality in a simple manner.

If the surface of the front-side and/or of the rear-side of the wafer is provided completely with an antireflection layer, this means that an antireflection layer is disposed on the entire surface of the front-side and/or of the rear-side of the wafer. However it should hereby be ensured that the region above the filter holes does not belong to the surface of the wafer. Consequently, also for the case where the surface of the front-side and/or of the rear-side of the wafer is therefore also provided completely with an antireflection layer, the antireflection layer is not disposed over the filter holes. Here also, the filter holes are therefore free and not covered by the antireflection layer.

If the surface of the front-side and/or of the rear-side of the wafer is provided completely with an antireflection layer, reflection measurements (e.g. Raman) can be implemented with very high measuring quality in any region of the wafer. In principle, also implementation of transmission measurements (e.g. FTIR) is possible here. In order to achieve a very high measuring quality with such transmission measurements, the antireflection layer should however have a transmission degree of at least 10% for radiation in individual portions from the wavelength range of 2,500 nm to 15,000 nm. In order to achieve this, the antireflection layer could be designed for example as spectral filter which influences both the reflection and the transmission only in selected wavelength ranges.

Preferably, the antireflection layer prevents the optical reflection of at least 90%, preferably of at least 99%, particularly preferably of more than 99%, of the radiation impinging thereon in the wavelength range of 200 nm to 10,000 nm.

A preferred embodiment of the filter substrate according to the invention is distinguished by the antireflection layer concerning a nanostructuring introduced in the surface of the wafer or a nanostructured coating applied on the surface of the wafer. Such nanostructuring and nanostructured coatings are very well suited as antireflection layers since no radiation or almost no radiation is reflected in the desired wavelength range. The nanostructuring can concern a local nanostructuring which is introduced e.g. by means of plasma etching. The nanostructured coating can concern e.g. the coating Nano Black® by ACKTAR.

In a further preferred embodiment, the wafer has a thickness greater than 100 μm, preferably greater than 250 μm, particularly preferably greater than 500 μm. A higher thickness of the wafer leads to a higher stability of the filter substrate. Then it can be used e.g. with even stronger flows for the filtering.

Furthermore, it is preferred if the filter substrate has a reinforcing structure for mechanical stabilisation of the wafer. This reinforcing structure can concern e.g. a coarse-mesh perforated underlayer, e.g. made of metal or specific plastic material. The wafer is supported by the reinforcing structure and hence stabilised even better. The reinforcing structure can be inserted together with the filter substrate in a suitable mounting. As a result of the better mechanical stabilisation because of the reinforcing structure, the filter substrate can be used with even stronger flows, for instance e.g. in waters with a greater flow.

A further preferred embodiment of the filter substrate according to the invention is characterised in that the wafer is a silicon wafer. This preferably has a doping degree of max. $10^{18}$ atoms/cm$^3$, particularly preferably of max. $10^{17}$ atoms/cm$^3$. Silicon wafers have, on the one hand, a high mechanical stability and, on the other hand, a high optical transparency in the relevant range for FTIR microscopy of 4,000 to 600 cm$^{-1}$. In addition, silicon wafers are stable relative to appropriate sterilisation methods, no effect taking place by the application of saturated salt solutions (inter alia $ZnCl_2$, NaCl, $CaCl_2$) or oxidative treatments with $H_2O_2$. Silicon wafers are therefore particularly suitable as basic element of the filter substrate according to the invention. Because of a low doping degree, the optical transparency or the transmission degree of the wafer can be increased, as a result of which the measuring quality with transmission measurements is increased even further.

In a further preferred embodiment of the filter substrate according to invention, the number of filter holes is at least 100, preferably at least 10,000, particularly preferably at least 1,000,000. By means of such a high number of filter holes, a particularly effective and rapid filtration can be achieved.

A further preferred embodiment is characterised in that the filter holes
are introduced by means of laser boring, and/or
form respectively a straight channel which extends perpendicular to the front-side and to the rear-side of the wafer, and/or
have a diameter of 1 μm to 4,000 μm, preferably of 1 μm to 2,500 μm, particularly preferably of 1 μm to 1,000 μm, very particularly preferably of 1 μm to 500 μm, and/or
are disposed, at least in regions, with a density of 1 filter hole per cm$^2$ to 1,000,000 filter holes per cm$^2$, preferably with a density of 100 filter holes per cm$^2$ to 10,000 filter holes per cm$^2$, in the filter substrate, and/or
all have the same diameter and/or the same geometry.

The filter holes can all have the same diameter and/or the same geometry. Alternatively, the filter holes can however also have different diameters and/or different geometries. Also the regions with filter holes can be subdivided on the wafer into sub-regions which differ from each other by the density of filter holes per cm$^2$. There can therefore be regions with a high density and regions with a low density of filter holes per cm$^2$ on the wafer.

The filter holes can be introduced into the wafer by means of laser boring. As a result, variable hole diameters and variable hole geometries can be obtained. The laser boring enables simple and economical production of variable filter holes≥1 μm in a variable arrangement and geometry, and also with acceptable filter surfaces and mechanical stability. The filter substrate is therefore particularly suitable for use in cascade filter systems for sampling volumes of up to several litres of medium (liquid or gas). Filter holes in the wafer produced by means of laser boring have characteristic damage because of the laser removal. The filter holes in the wafer produced by means of laser boring hence differ from filter holes produced in a different way. The production of the filter holes by means of laser boring can be verified by microanalyses.

The present invention also relates to a method for the production of a filter substrate according to one of the preceding claims in which, in a wafer with a thickness of 100 μm and a transmission degree of at least 10% for radiation in the wavelength range of 2,500 nm to 15,000 nm, filter holes with a diameter of 1 μm to 5 mm are introduced at least in regions, and the surface of the front-side and/or the surface of the rear-side of the wafer is provided, completely or in regions, with an antireflection layer which prevents an optical reflection of radiation in the wavelength range of 200 nm to 10,000 nm.

The method hence comprises two main steps, namely, on the one hand, the provision of the surface of the wafer with the antireflection layer and, on the other hand, the introduction of the filter holes into the wafer. These two steps can be effected in any sequence. For example, the wafer can be provided firstly with the antireflection layer, then subsequently the filter holes being introduced into the wafer. The filter holes in this case are then introduced such that they extend through the entire thickness of the wafer or of the filter substrate including the antireflection layer—if this is present in the region of the respective filter hole. Alternatively, also the filter holes can be introduced first into the wafer, then subsequently the wafer being provided with the antireflection layer. Application of the antireflection layer is then effected in this case such that the filter holes are exposed and not covered by the antireflection layer.

According to a preferred variant of the method according to the invention, introduction of the filter holes is effected by means of laser boring. The laser boring enables simple and economical production of variable filter holes≥1 μm in variable arrangement and geometry, and also with acceptable filter surfaces and mechanical stability. The filter substrate is therefore particularly suitable for use in cascade filter systems for sampling volumes of up to several litres of medium (liquid or gas).

Furthermore, it is preferred that the front-side and/or the rear-side of the wafer is consequently provided with the antireflection layer by nanostructuring being introduced into the surface of the wafer or a nanostructured coating being applied on the surface of the wafer.

For example, firstly a structured coating is applied on the surface of the wafer, then subsequently the filter holes being introduced into the wafer. The filter holes in this case are introduced then such that they extend through the entire thickness of the wafer or of the filter substrate including the antireflection layer—if this is present in the region of the respective filter hole.

According to an alternative example, firstly the filter holes are introduced into the wafer, then subsequently a nanostructuring being introduced into the surface of the wafer. The application of the antireflection layer is hence effected such that the filter holes are exposed and not covered by the antireflection layer.

Preferably, production of the antireflection layer is effected before or after introduction of the filter holes.

A further preferred variant of the method according to the invention is characterised in that the wafer is provided with a reinforcing structure for the mechanical reinforcement thereof. The wafer and the reinforcing structure are introduced into a common mounting particularly preferably. The reinforcing structure can concern for example a coarse-mesh perforated underlayer, e.g. made of metal or specific plastic material.

Furthermore, the present application also relates to the use of the filter substrate according to the invention for filtering microparticles and for subsequent optical characterisation of the microparticles on the filter substrate by means of transmission spectroscopy, preferably IR spectroscopy, e.g. spectroscopy, and/or reflection spectroscopy, preferably Raman spectroscopy.

The filter substrate according to the invention is used in cascade filter systems for environmental-analytical monitoring of the introduction paths of microplastics into flowing waters. There is great correlation here with the use in corresponding analysis devices (IR, Raman, chemometric data evaluation). This application opens up a large number of progressive fields of use in exploration and development relating to microparticles in the environment (water, air) and in industrial processes. The use in industry is revealed in the monitoring and sampling of special process steps.

With reference to the subsequent example and also to the subsequent Figure, the present invention is intended to be explained in more detail without restricting said invention to the specific embodiments and parameters shown here.

EMBODIMENTS

In FIG. 1, a first embodiment of the filter substrate according to the invention and also the use thereof is illustrated schematically. The filter substrate comprises a wafer 1 with a thickness of at least 100 μm and a transmission degree of at least 10% for radiation in the wavelength range of 2,500 nm to 15,000 nm. The wafer 1 concerns a silicon wafer which has a doping degree of max. $10^{17}$ atoms/cm$^3$. The surface of the front-side of the wafer 1 is provided in regions with an antireflection layer 2 which prevents optical reflection of radiation in the wavelength range of 200 nm to 10,000 nm. Of concern hereby is an antireflection layer which prevents the optical reflection by more than 99% of the radiation impinging thereon in the wavelength range of 200 nm to 10,000 nm. The wafer 1 has, at least in regions, filter holes 3 with a diameter of 1 μm to 5 mm. The filter holes 3 are introduced by means of laser boring and respectively form a straight channel which extends perpendicular to the front-side and to the rear-side of the wafer 1.

During the filter process, the medium 4 to be filtered (liquid or gas) can pass through the filter holes 3, the microparticles 5 contained in the medium remaining suspended on the front-side of the filter substrate.

After the filter process, the optical characterisation of the microparticles can be effected directly on the filter substrate, the microparticles 5 being irradiated with light 6. In the region or the regions of the filter substrate without an antireflection layer (region A), the optical characterisation can be effected by means of transmission measurement (e.g. FTIR). Because of the high transmission degree of the wafer, a large part of the light can be transmitted through the wafer.

The transmitted light 7 can then be analysed. From the high transmission degree of the wafer, a very good measuring quality results.

In the region or the regions of the filter substrate with an antireflection layer 2 (region B), the optical characterisation can be effected in addition also by means of reflection measurements (e.g. Raman). The incident light 6 impinges on the microparticles 5 and is reflected. The reflected light 8 can then be analysed. Because of the antireflection layer 2, a very good signal-to-noise ratio is obtained, from which a very good measuring quality results.

Figure 2:
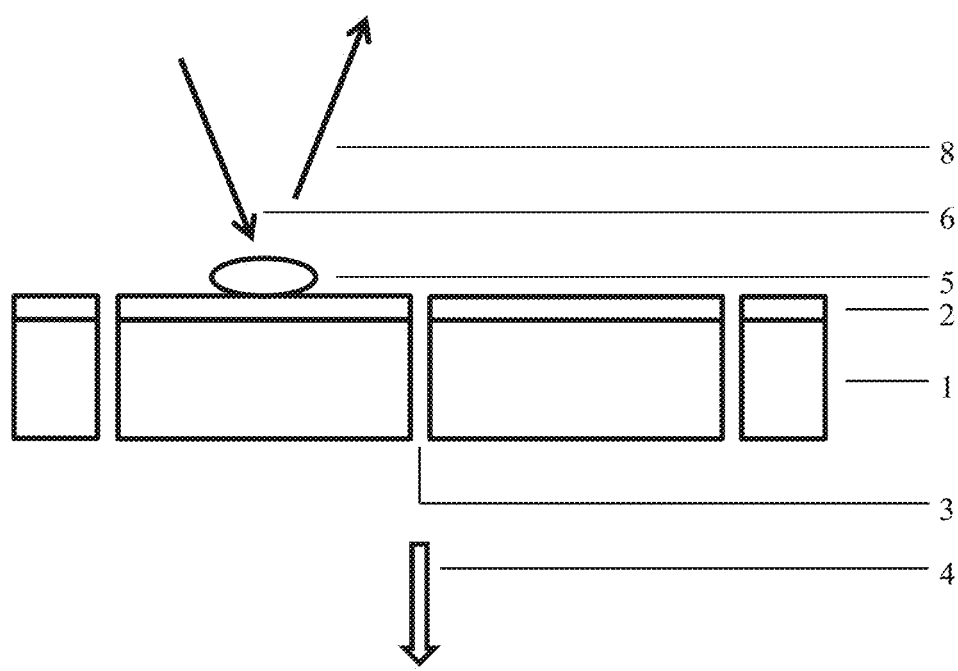
FIG. 2 illustrates a second embodiment of the filter substrate according to the invention. Also illustrated is a method of use thereof.

In FIG. 2, a second embodiment of the filter substrate according to the invention and also the use thereof is illustrated schematically. This second embodiment differs from the previously described first embodiment merely by the surface of the front-side of the wafer 1 being provided completely with the antireflection layer 2. Otherwise, the filter substrates of both embodiments are identical.

As a result of the fact that the entire surface of the front-side of the filter substrate is provided with the antireflection layer 2, the optical characterisation can be effected at any place of the wafer 1 or of the filter substrate by means of reflection measurements (e.g. Raman). The incident light 6 impinges on the microparticles 5 and is reflected. The reflected light 8 can then be analysed. Because of the antireflection layer 2, a very good signal-to-noise ratio is obtained, from which a very good measuring quality results.

In addition, the optical characterisation can be effected in principle also by means of transmission measurement (e.g. FTIR) (not illustrated in FIG. 2). In order to achieve a very high measuring quality even with these transmission measurements, the antireflection layer should however have a transmission degree of at least 10% for radiation in the wavelength range of 2,500 nm to 15,000 nm.

In the following, a variant, given by way of example, of the method according to the invention for producing the filter substrate according to the invention is described.

Firstly, Si filter substrates (thickness 150 μm) were produced by laser boring in polished silicon wafers. A laser process with the following parameters was used: wavelength 532 nm, pulse duration 8 ns, repetition rate 50 kHz, power 3 W. As a function of the required filter properties (particle size and throughflow), variable hole structures with diameters in the range of a few millimetres to approx. 50 μm can be achieved with an ns laser (see FIG. 3). Smaller filter holes were already produced by ultrashort pulse lasers and/or electrochemical etching processes.

Figure 3:
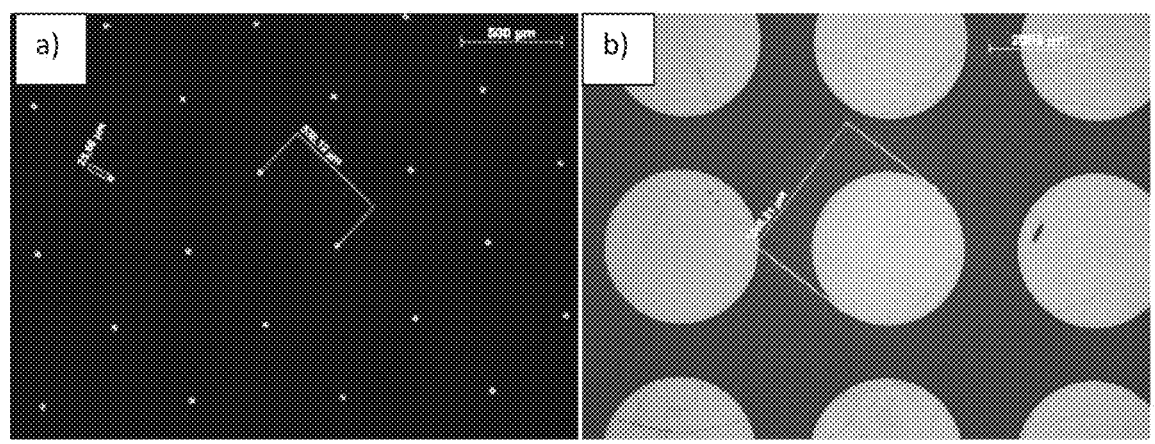
FIG. 3 illustrates a) an incident-light microscopic image of an Si filter for the particle size class 3,000 μm (all particles greater than 3,000 μm are collected in this filter), and b) a transmitted-light microscopic image of a filter for the particle size class 30 μm is shown.

In this context, FIG. 3 shows in a) an incident-light microscopic image of an Si filter for the particle size class 3,000 μm (all particles greater than 3,000 μm are collected in this filter). In b), a transmitted-light microscopic image of a filter for the particle size class 30 μm is shown.

In addition, an antireflection layer can be produced on the silicon wafers simply by sputtering deposition processes. For example, an $SiN_x$ layer is deposited with the optical layer thickness λ/4 which leads by interference to a reduced reflection in the range of the wavelength λ. Optionally broadband antireflection layers can be produced by a nano-structuring (black silicon) with plasma etching processes. The layer deposition can be effected before or after introduction of the filter holes in the Si wafer. The process sequence of layer deposition/laser boring depends upon the required precision of the hole diameters and upon the respective deposition process. In the case of conformal deposition methods and small hole diameters, an antireflection layer production leads to more precise hole geometries.

The invention claimed is:

1. A filter substrate for filtering and optical characterization of microparticles, comprising a wafer with a thickness of at least 100 μm and a transmission degree of at least 10% for radiation in the wavelength range of 2,500 nm to 15,000 nm, the surface of the front-side and/or the surface of the rear-side of the wafer being provided, completely or in regions, with an antireflection layer which prevents an optical reflection of radiation in the wavelength range of 200 nm to 10,000 nm, and the wafer having, at least in regions, filter holes with a diameter of 1 μm to 5 mm.

2. The filter substrate according to claim 1, wherein the antireflection layer is a nanostructure which is introduced in the surface of the wafer or a nanostructured coating which is applied on the surface of the wafer.

3. The filter substrate according to claim 1, wherein the wafer has a thickness greater than 100 μm.

4. The filter substrate according to claim 3, wherein the wafer has a thickness greater 250 μm.

5. The filter substrate according to claim 1, wherein the filter substrate has a reinforcing structure for mechanical stabilization of the wafer.

6. The filter substrate according to claim 1, wherein the wafer is a silicon wafer.

7. The filter substrate according to claim 6, which has a doping degree of max $10^{18}$ atoms/cm$^3$.

8. The filter substrate according to claim 1, wherein the number of filter holes is at least 100.

9. The filter substrate according to claim 8, wherein the number of filter holes is at least 10,000.

10. The filter substrate according to claim 1, wherein the filter holes
   are introduced by laser boring, and/or
   form respectively a straight channel which extends perpendicular to the front-side and to the rear-side of the wafer, and/or
   have a diameter of 1 μm to 4,000 μm, and/or
   are disposed, at least in regions, with a density of 1 filter hole per cm$^2$ to 1,000,000 filter holes per cm$^2$, in the filter substrate, and/or
   all have the same diameter and/or the same geometry.

11. A method of filtering microparticles comprising utilizing the filter substrate according to claim 1 for filtering the microparticles and subsequently optically characterizing the filtered microparticles by transmission spectroscopy and/or reflection spectroscopy.

12. A method for the production of a filter substrate according to claim 1, in which, in a wafer with a thickness of at least 100 μm and a transmission degree of at least 10% for radiation in the wavelength range of 2,500 nm to 15,000 nm, filter holes with a diameter of at least 1 μm are introduced at least in regions, and the surface of the front-side and/or the surface of the rear-side of the wafer is provided, completely or in regions, with an antireflection layer which prevents an optical reflection of radiation in the wavelength range of 200 nm to 10,000 nm.

13. The method according to claim 12, the filter holes are introduced by laser boring.

14. The method according to claim 12, wherein the front side and/or the rear side of the wafer is provided with the antireflection layer by a nanostructure being introduced into the surface of the wafer or a nanostructured coating being applied on the surface of the wafer.

15. The method according to claim 12, wherein the production of the antireflection layer is effected before or after the introduction of the filter holes.

16. The method according to claim 12, wherein the wafer is provided with a reinforcing structure for the mechanical reinforcement thereof.

* * * * *